US009830507B2

(12) United States Patent
Vetek et al.

(10) Patent No.: US 9,830,507 B2
(45) Date of Patent: Nov. 28, 2017

(54) METHOD AND APPARATUS FOR DETECTING FACIAL CHANGES

(75) Inventors: Akos Vetek, Helsinki (FI); Jukka Lekkala, Tampere (FI); Antti Vehkaoja, Tampere (FI); Jarmo Verho, Tampere (FI); Ville Rantanen, Ylojarvi (FI); Veikko Surakka, Tampere (FI); Toni Vanhala, Tampere (FI); Oleg Spakov, Tampere (FI)

(73) Assignee: Nokia Technologies Oy, Espoo (FI)

( * ) Notice: Subject to any disclaimer, the term of this patent is extended or adjusted under 35 U.S.C. 154(b) by 8 days.

(21) Appl. No.: 13/073,820

(22) Filed: Mar. 28, 2011

(65) Prior Publication Data

US 2012/0254244 A1 Oct. 4, 2012

(51) Int. Cl.
*G06K 9/00* (2006.01)

(52) U.S. Cl.
CPC .............................. *G06K 9/00315* (2013.01)

(58) Field of Classification Search
CPC .............................. G06F 3/011; G06F 3/017
USPC .................................................. 324/658–690
See application file for complete search history.

(56) References Cited

U.S. PATENT DOCUMENTS

| 3,192,321 | A | | 6/1965 | Nassimbene |
| 3,383,466 | A | | 5/1968 | Hillix et al. |
| 6,965,842 | B2 | * | 11/2005 | Rekimoto .................... 702/150 |
| 7,805,171 | B2 | | 9/2010 | Alameh et al. |
| 2004/0243342 | A1 | | 12/2004 | Rekimoto |
| 2004/0243416 | A1 | | 12/2004 | Gardos |
| 2007/0060830 | A1 | | 3/2007 | Le et al. |
| 2008/0220831 | A1 | * | 9/2008 | Alameh et al. ............. 455/575.2 |
| 2009/0225043 | A1 | * | 9/2009 | Rosener .................. G06F 3/016 345/173 |
| 2009/0252351 | A1 | * | 10/2009 | Rosener ......................... 381/151 |
| 2010/0306711 | A1 | * | 12/2010 | Kahn et al. .................... 715/863 |
| 2011/0032126 | A1 | * | 2/2011 | Brusell et al. .................. 341/33 |

FOREIGN PATENT DOCUMENTS

| CN | 1531676 | 9/2004 |
| CN | 101663879 | 3/2010 |
| DE | 4212907 | 10/1993 |
| EP | 1394665 | 3/2004 |
| WO | WO2008109194 | 9/2008 |

OTHER PUBLICATIONS

Chen, Z. et al., "Design and Implementation of Capacitive Proximity Sensor Using Microelectromechanical Systems Technoloy", IEEE Transactions on Industrial Electronics, vol. 45, No. 6, Dec. 1998, pp. 886-894.

(Continued)

*Primary Examiner* — Jermele M Hollington
*Assistant Examiner* — Feba Pothen
(74) *Attorney, Agent, or Firm* — Locke Lord LLP

(57) ABSTRACT

In accordance with an example embodiment, there is an apparatus that has a headset, a contactless proximity sensor arranged to be supported by the headset in the proximity of a face of a user, and a sensor circuitry configured to cause output of a signal indicative of temporal variations in the distance between the contactless proximity sensor and the face of the user.

17 Claims, 5 Drawing Sheets

(56) References Cited

OTHER PUBLICATIONS

International Search Report of International Application No. PCT/F12012/050290—dated Jul. 2012, 6 pages.
English Language Machine Translation of Chinese Patent Application Publication No. CN101663879, 9 pages.
English Language Machine Translation of Chinese Patent Application Publication No. CN1531676, 7 pages.
English Language Machine Translation of German Patent Application Publication No. DE4212907, 13 pages.
Dana, S.S. et al., "Combined Microphone and Capacitance Meter for Computer 'Lip Reading'", IBM Technical Disclosure Bulletin, vol. 33, No. 6A, Nov. 1990, 1 page.
Extended European Search Report for European Patent Application No. 12764686.7, dated Oct. 31, 2014, 8 pages.
Fasel, B., et al., "Automatic facial expression analysis: a survey", Pattern Recognition 36 (2003), pp. 259-275.
"Facial Action Coding System", Wikipedia, http://en.wikipedia.org/wiki/Facial_Action_Coding_System, downloaded Mar. 28, 2011, 7 pages.
"avatarKINECT, Bring Your Avatar to Life. Coming Spring 2011", www.xbox.com/en-US/Kinect/KinectAvatars, downloaded Mar. 28, 2011, 2 pages.
"Why Intel Sandy Bridge is a Game Changer", TrustedReviews, http://www.trustedreviews.com/cpu-memory/review/2011/01/06/Why-Intel-Sandy-Bridge-Is-a-Grame-Changer/p1, downloaded Mar. 28, 2011, 3 pages.

* cited by examiner

METHOD AND APPARATUS FOR DETECTING FACIAL CHANGES

TECHNICAL FIELD

The present application relates generally to detecting of facial changes.

BACKGROUND

Human face has a large number of muscles that move and cause facial changes in result of feelings and intentional movements of the jaw, nose, and lips, for instance. Human beings largely rely on such non-verbal information that we see of one another in our natural intercourse. Machines, however, are not typically capable of making use of non-verbal information. So far, motion of facial muscles has been detected by electrodes attached to the cheek of a person and by processing image information of a camera that is focused on the face of the person.

SUMMARY

Various aspects of examples of this document are set out in the claims.

According to a first example aspect of this document, there is provided an apparatus, comprising:
a headset;
a contactless proximity sensor arranged to be supported by the headset in the proximity of a face of a user; and
a sensor circuitry configured to cause output of a signal indicative of temporal variations in the distance between the contactless proximity sensor and the face of the user.

According to a second example aspect of this document, there is provided a method, comprising:
associating facial detection criteria with facial movements;
receiving capacitance variation information based on operation of one or more capacitive sensors attached to a headset in the proximity of a face of a user;
searching for the associated facial changes from the received capacitance variation information using the facial detection criteria; and
determining the facial change that is associated with the matched facial detection criteria in question on finding a sufficient correspondence between the facial detection criteria and the received capacitance variation information.

According to a third example aspect of this document, there is provided an apparatus, comprising:
at least one processor; and
at least one memory including computer program code;
the at least one memory and the computer program code being configured to, with the at least one processor, cause the apparatus to perform at least the following:
associating facial detection criteria with facial movements;
receiving capacitance variation information based on operation of one or more capacitive sensors attached to a headset in the proximity of a face of a user;
searching for the associated facial changes from the received capacitance variation information using the facial detection criteria; and
determining the facial change that is associated with the matched facial detection criteria in question on finding a sufficient correspondence between the facial detection criteria and the received capacitance variation information.

According to a fourth example aspect of this document, there is provided a non-transitory computer-readable medium having computer program code embodied therein for use with a computer, the computer program code comprising:
code for associating facial detection criteria with facial movements;
code for receiving capacitance variation information based on operation of one or more capacitive sensors attached to a headset in the proximity of a face of a user;
code for searching for the associated facial changes from the received capacitance variation information using the facial detection criteria; and
code for determining the facial change that is associated with the matched facial detection criteria in question on finding a sufficient correspondence between the facial detection criteria and the received capacitance variation information.

BRIEF DESCRIPTION OF THE DRAWINGS

For a more complete understanding of example embodiments of this document, reference is now made to the following descriptions taken in connection with the accompanying drawings in which.

DETAILED DESCRIPTION OF THE DRAWINGS

Figure 1:
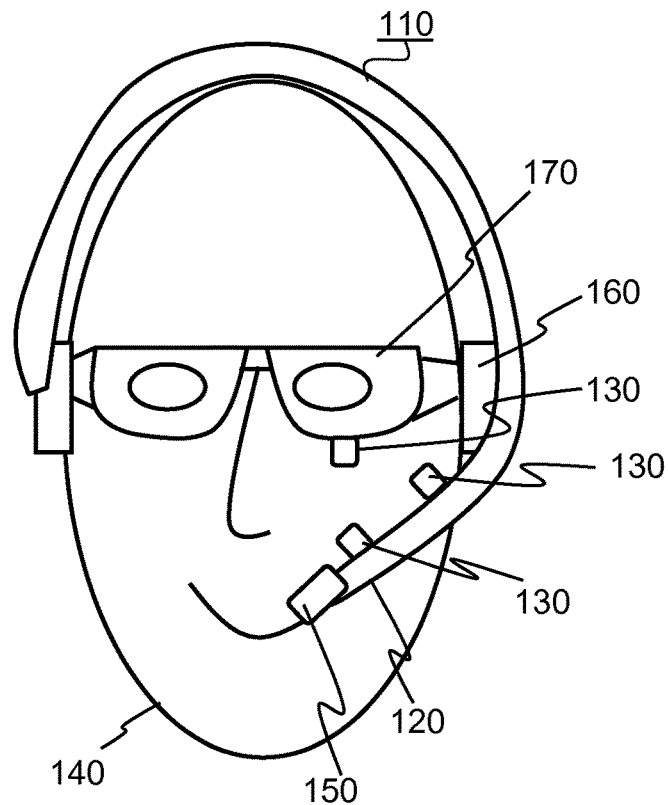
FIG. 1 shows an apparatus of one example embodiment for headset-integrated/wearable facial movement detection with non-contact sensors.

FIG. 1 shows an apparatus of one example embodiment for headset-integrated/wearable facial movement detection with non-contact sensors. The apparatus of FIG. 1 is usable, for instance, for obtaining information from the head area that provides rich and multipurpose cues that express attention, intentions, and emotions. The head area can produce any of the following movements: head nodding to indicate interest; and brief spontaneous facial expressions that indicate experienced emotions. In particular, facial expressions are a rich source of social and emotional information and also a potentially useful modality for voluntary control of mobile devices or associated external devices.

It is appreciated that facial expressions and their underlying physiology provide a good basis for building a robust system for monitoring human emotions.

In FIG. 1, there is a headset 110 in which the microphone arm 120 supports one or more (non-contact) capacitive sensors or electrodes 130 along the length of the arm 120 for registering of facial movements of a user's face 140. The microphone arm 120 also holds a microphone 150 near the user's face 140. In another embodiment, there is no microphone 150 but only an arm that holds one or more capacitive sensors 130. In one further example embodiment, also shown in FIG. 1, there is a headset 110 that comprises one or more capacitive sensors 130 and one or more speakers 160. In one yet further example embodiment, also shown in FIG. 1, the headset 110 also comprises a vision element 170 such as eyeglasses or a proximity display. The vision element 170 is usable to support one or more capacitive sensors in the proximity of the face 140.

The one or more capacitive sensors 130 are positioned on the surface or integrated partly or entirely in any structure of the headset 110 that reaches near the face 140. The microphone arm 120 allows extending more than one capacitive sensors 130 over one side of the face. The facial movements that are being detected can be either voluntary or spontaneous. The detection of facial movements is output to another device and/or processed with the apparatus of FIG. 1 itself for various purposes, such as:

sensing of emotion or activity;
richer computer-mediated communication; and/or
issuing commands and control.

The entity that receives the detection of facial movements is referred to as a data sink.

The capacitive sensors 130 are implemented in some embodiments using the principle known from capacitive feather-touch buttons. Such buttons operate so that a finger (in this case facial area) shunts electric field to the ground. On operating, the capacitive sensors 130 create an electric field that is shunted by a target (most proximate) area on the face that is moved by facial muscles. When the target area moves, so will the shunting of the electric field change. This enables producing of an electric signal indicative of changes in the proximity of the target area to the capacitive sensor 130. •When the muscles are relaxed, the measured capacitance stays at a certain level resulting from the amount of occurring shunting. •Activation of muscles causes movement that affects shunting, and thus increases or decreases the measured capacitance. One example embodiment uses a single-electrode approach which results in a simple structure and relatively small electrode area.

Figure 2:
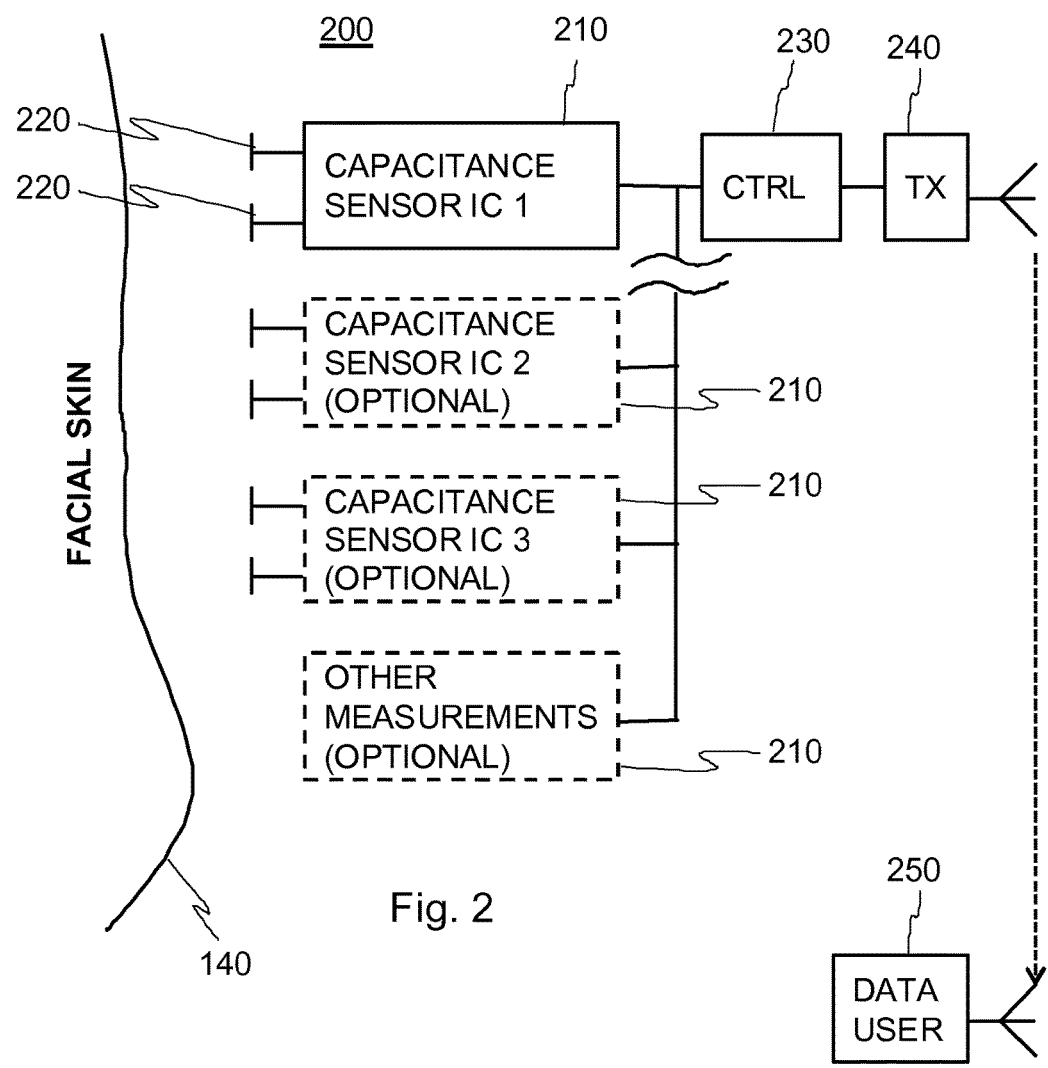
FIG. 2 shows a block diagram according to an example embodiment of a system comprising one or more capacitive sensors in the proximity of the face.

FIG. 2 shows a block diagram according to an example embodiment of a system comprising one or more capacitive sensors 130 in the proximity of the face 140. The block diagram presents a set of capacitance sensor circuitries (such as integrated circuits) 210 each coupled to associated capacitive plates or elements 220 proximate to the face 140 (two capacitive elements drawn here, while some in some embodiments only one is used). Functionally connected with the capacitance sensor circuitries there is a controller 230 such as a micro-controller. Further on, the system 200 comprises a transmitter 240 (e.g. a wireless transmitter such as a radio transmitter, infra-red transmitter, audio wave transmitter or a wired transmitterer) configured to forward information from the controller 230 to a data sink 250. The data sink 250 is configured to make use of facial movements of the user. In one example embodiment, the data sink 250 is selected from a group consisting of a mobile phone; game device; portable computer; social media device; health monitor; and navigator. It is appreciated that FIG. 2 shows merely one example, and the implementation details are freely variable by ordinarily skilled persons. For instance, in some particular example embodiments, a common controller 230 is configured to operate with two or more capacitance sensor circuitries 210, one capacitance sensor circuitry can be coupled with two or more (sets of) capacitive elements 220, and/or different blocks can be integrated or distributed. The system 200 forms contactlessly electric signals indicative of the proximity of one or more capacitive sensors 130 with the face 140 and transmits corresponding signals forward to one or more data sinks 250 for their disposal.

Figure 3:
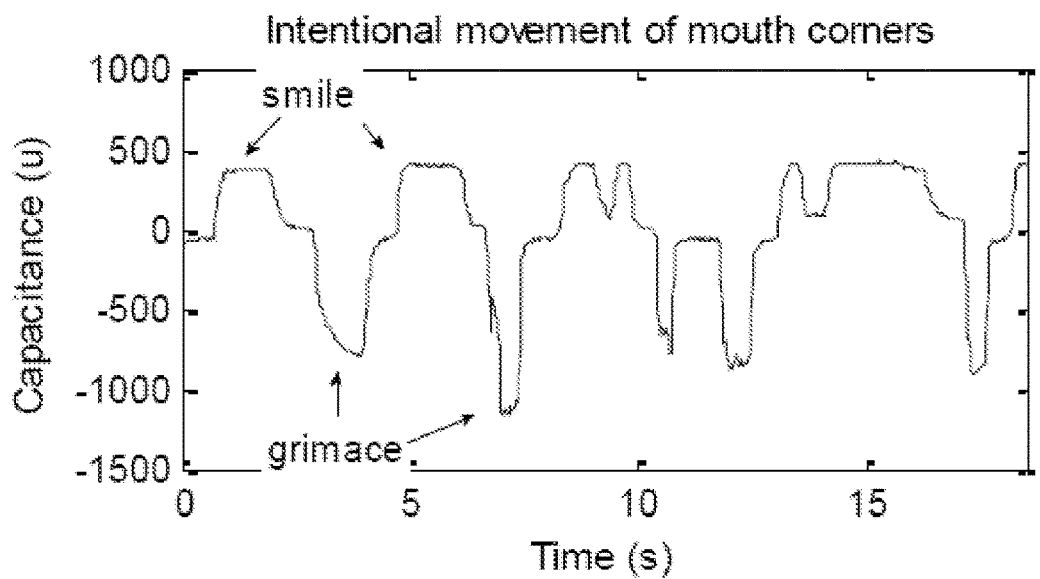
FIG. 3 shows variations of capacitance of a single electrode capacitive sensor when measured at the corner of mouth, while the user is intentionally moving the mouth to smile or grimace.

FIG. 3 shows variations of capacitance of a single electrode capacitive sensor 130 when measured at the corner of mouth, while the user is intentionally moving the mouth to smile or grimace. Clearly, the smiling brings the face 140 closer to the capacitive sensor 130 and results in a higher capacitance whereas grimace produces an opposite change.

Figure 4:
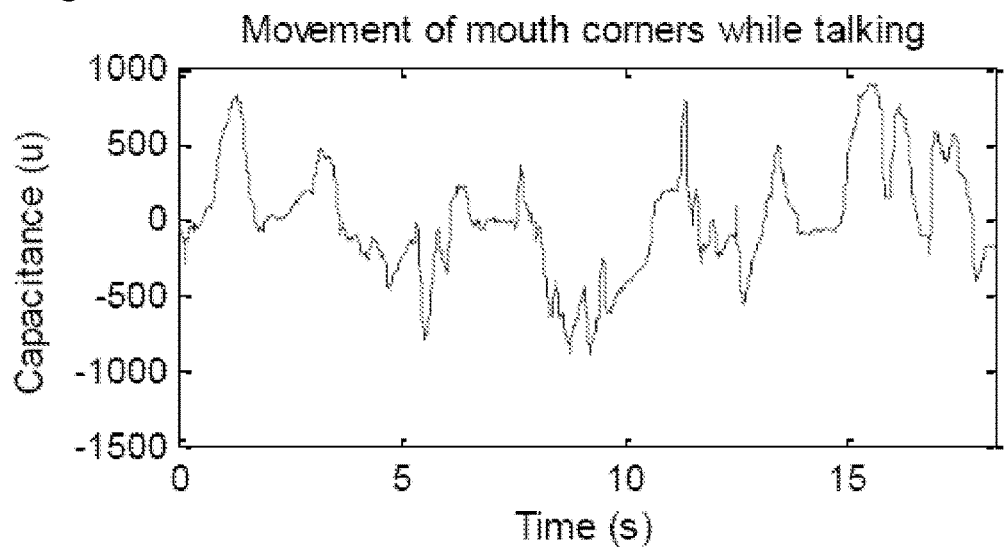
FIG. 4 shows variations of capacitance of a single electrode capacitive sensor when measured at the corner of mouth, while the user is talking.

FIG. 4 shows variations of capacitance of a single electrode capacitive sensor 130 when measured at the corner of mouth, while the user is talking. In this case, the high peaks are far shorter than in FIG. 3 and the minimums are less deep and shorter than in FIG. 3.

Figure 5:
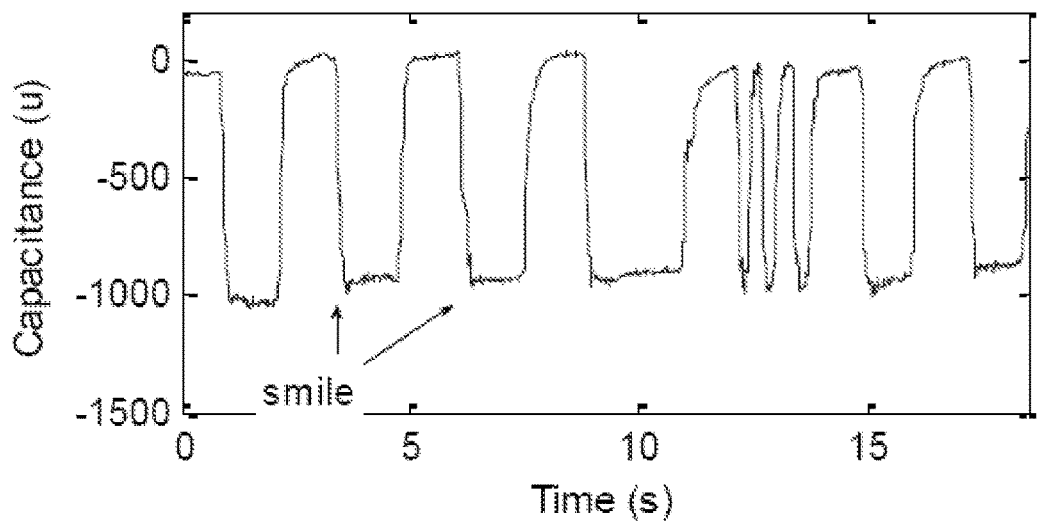
FIGS. 5 and 6 show how the measured capacitance is affected by intentional movement of cheeks and by talking, respectively.
Figure 6:
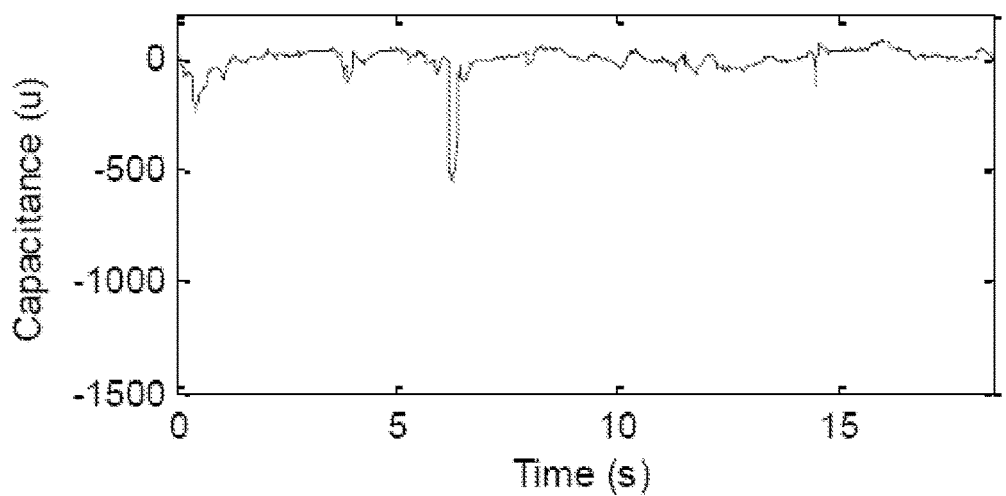

FIGS. 5 and 6 show how the measured capacitance is affected by intentional movement of cheeks and by talking, respectively. FIG. 5 indicates smiling as deep recesses in a graph of capacitance when the face 140 at a cheek distances from the capacitive sensor 130. FIG. 6 shows how the capacitance remains on a substantially higher level while the user is talking.

Figure 7:
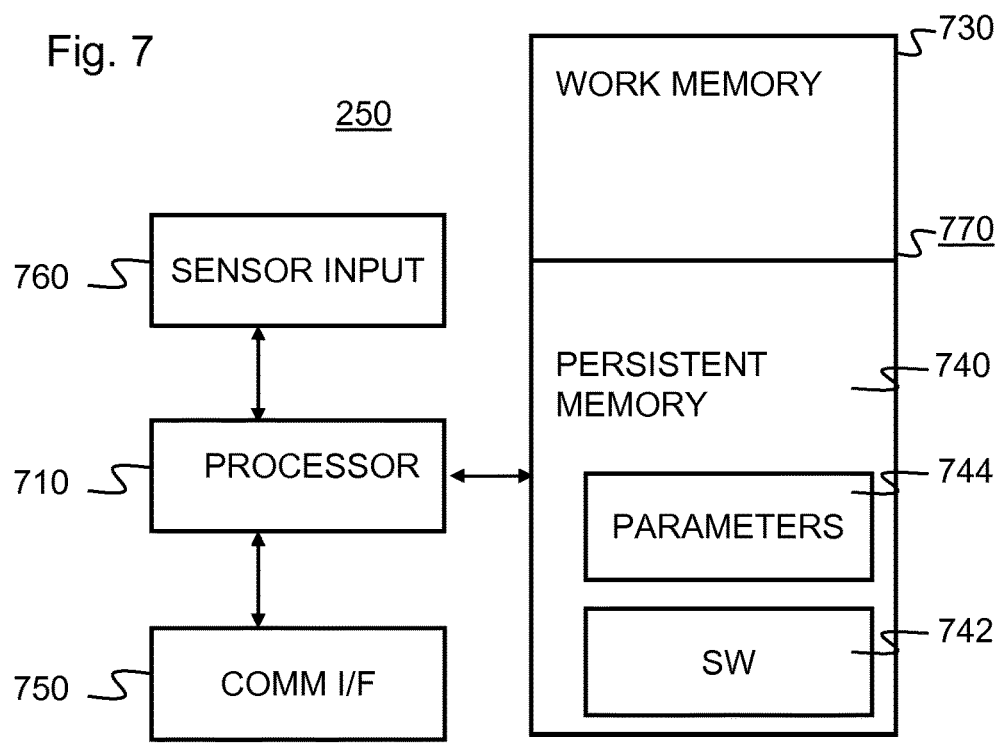
FIG. 7 presents an example block diagram of the data sink suited for use e.g. in the example embodiment of FIG. 2.

FIG. 7 presents an example block diagram of the data sink 250 suited for use e.g. in the example embodiment of FIG. 2. The data sink 250 comprises a communication interface module 750, a processor 710 coupled to the communication interface module 750, and a memory 720 coupled to the processor 710. The apparatus further comprises software 730 stored in the memory 720 and operable to be loaded into and executed in the processor 710. In an example embodiment, the software 730 comprises one or more software modules. The software 730 can be in the form of a computer program product that is software stored in a computer readable memory medium.

The communication interface module 750 is configured to receive communications over one or more local links from the system 200. The local links are implemented in some example embodiments as wired and/or wireless links. In one embodiment, the communication interface module 750 further implements telecommunication links suited for establishing links with other users or for data transfer (e.g. using the Internet). Such telecommunication links are, for instance, links using any of: wireless local area network links, Bluetooth, ultra-wideband, cellular or satellite communication links. In one embodiment, the communication interface module 750 is integrated into the data sink 250 or into an adapter, card or the like (that in one embodiment is inserted into a suitable slot or port of the data sink 250). While FIG. 7 shows one communication interface module 750, the data sink 250 comprises in one embodiment a plurality of communication interface modules 750.

The processor 710 is, e.g., a central processing unit (CPU), a microprocessor, a digital signal processor (DSP), a graphics processing unit, an application specific integrated circuit (ASIC), a field programmable gate array, a micro data sink 250 or a combination of such elements. FIG. 7 shows one processor 710. In some embodiments, the data sink 250 comprises a plurality of processors.

The memory 720 is, for example, a volatile or a non-volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The data sink 250 comprise one or more memories. The memory 720 is constructed as a part of the data sink 250 in one embodiment. In another embodiment, the memory 720 is inserted into a slot, or connected via a port, or the like of the data sink 250. In one embodiment, the memory 720 serves the sole purpose of storing data. In an alternative embodiment, the memory 720 is constructed as a part of an apparatus serving other purposes, such as processing data.

A skilled person appreciates that in addition to the elements shown in FIG. 7, in other embodiments the data sink 250 comprises other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, a disposable or rechargeable battery (not shown) for powering the data sink 250 when external power if external power supply is not available, and/or other elements.

Figure 8:
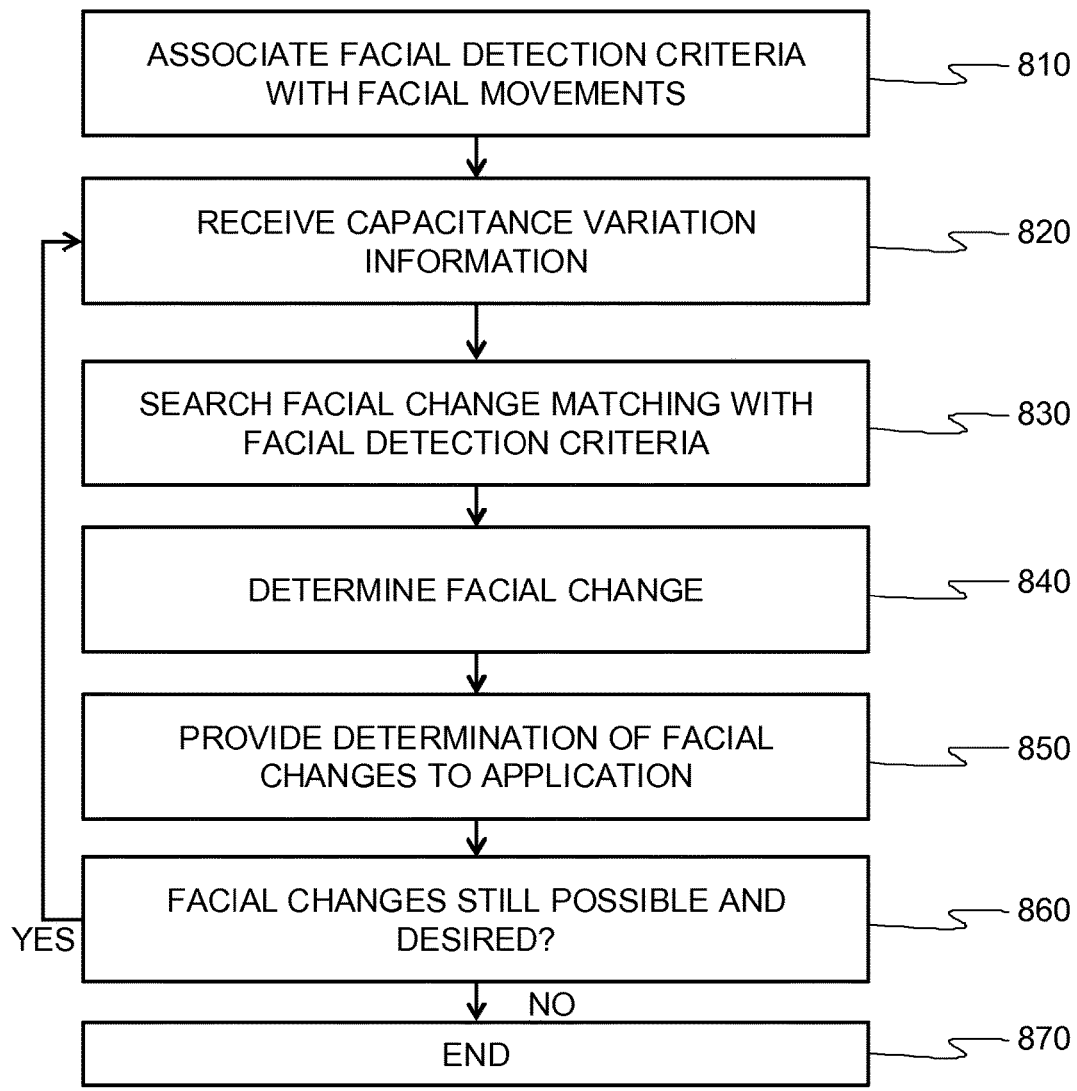
FIG. 8 shows a block diagram illustrative of a process for detecting particular facial movements with a data sink in accordance with one example embodiment.

FIG. 8 shows a block diagram illustrative of a process for detecting particular facial movements with a data sink 250 in accordance with one example embodiment. In step 810, facial detection criteria are associated for different facial changes, for instance for smiling, lifting of a cheek, moving of a corner of mouth, grimacing or talking. Capacitance variation information is received 820 based on operation of one or more capacitive sensors 130 in the proximity of the face of a user who is wearing the headset 110. Using the facial detection criteria the associated facial changes are searched 830 from the received capacitance variation information. On finding a sufficient correspondence between the facial detection criteria and the received capacitance variation information, the facial change is determined 840 that is associated with the matched facial detection criteria in question. A determination is provided 850 for an application that makes use of the determination of facial changes. The process is then repeated until the determination of facial changes is no longer desired or possible (e.g. if it is detected 860 that the user does not wear the headset 110). If yes, the process resumes to step 820, otherwise the process ends in step 870.

Without in any way limiting the scope, interpretation, or application of the claims appearing below, a technical effect of one or more of the example embodiments disclosed herein is that the capacitive measurement avoids the need for skin contact. Another technical effect of one or more of the example embodiments disclosed herein is that placing of the capacitive sensor(s) to a wearable headset 110 may make it easy to start using facial movement detection. Another technical effect of one or more of the example embodiments disclosed herein is that the use of a headset 110 may be easily used in mobile applications. Another technical effect of one or more of the example embodiments disclosed herein is that the use of capacitive sensing may avoid lighting issues. Another technical effect of one or more of the example embodiments disclosed herein is that the use of capacitive sensing may operate independent of the complexion of skin (e.g. skin tones/colors). Another technical effect of one or more of the example embodiments disclosed herein is that the use of capacitive sensing may avoid problems with facial hair, as the skin need not be seen and there is no need for electric contact with the skin.

Embodiments of this document may be implemented in software, hardware, application logic or a combination of software, hardware and application logic. The software, application logic and/or hardware may reside on a capacitive controller 230, capacitance sensor circuitry 210, transmitter 240 and/or on the data sink 250 that is configured to receive and process the signals sent by the transmitter 240. In an example embodiment, the application logic, software or an instruction set is maintained on any one of various conventional computer-readable media. A "computer-readable medium" is in some embodiments a medium or means that is able to contain, store, communicate, propagate or transport the instructions for use by or in connection with an instruction execution system, apparatus, or device, such as a computer, with one example of a computer described and depicted in FIG. 7. The instructions are suited, for example, for use by or in connection with an instruction execution system, apparatus, or device, such as a computer.

If desired, the different functions discussed herein can be performed in a different order and/or concurrently with each other. Furthermore, if desired, one or more of the above-described functions or elements can be omitted or combined with other functions or elements as is readily understood by a skilled person in view of this document.

Although various aspects of this document are set out in the independent claims, other aspects of this document comprise other combinations of features from the described embodiments and/or the dependent claims with the features of the independent claims, and not solely the combinations explicitly set out in the claims.

It is also noted herein that while the above describes example embodiments of this document, these descriptions should not be viewed in a limiting sense. Rather, there are several variations and modifications which may be made without departing from the scope of the present invention as defined in the appended claims.

We claim:

1. An apparatus, comprising:
   a headset;
   a contactless proximity sensor arranged to be supported by a microphone arm of the headset in the proximity of a face of a user, the sensor comprising a capacitive electrode configured to detect a capacitance between the electrode and a corner of the user's mouth indicative of facial movements of the user's face while the electrode and the corner of the user's mouth are at a non-zero distance from one another, wherein the microphone arm of the headset comprises an arm including a microphone, the arm configured to extend over a cheek of the user to the proximity of the mouth of the user; and
   a sensor circuitry configured to cause output of a signal indicative of a non-binary range of temporal variations in the distance between the capacitive electrode of the contactless proximity sensor and the corner of the user's mouth.

2. The apparatus of claim 1, further comprising a wireless transmitter for the output of the signal indicative of temporal variations in the distance between the contactless proximity sensor and the corner of the user's mouth.

3. The apparatus of claim 1, further comprising one or more further contactless proximity sensors for outputting with the sensor circuitry further signals indicative of temporal variations in the distance between respective contactless proximity sensor and the face of the user.

4. The apparatus of claim 3, wherein the contactless proximity sensors are arranged to be supported by the headset in the proximity of different parts of the face of the user.

5. The apparatus of claim 1, further comprising a wireless transmitter configured to wirelessly output the signal indicative of temporal variations in the distance between the contactless proximity sensor and the corner of the user's mouth.

6. A method, comprising:
associating facial detection criteria with facial movements;
receiving capacitance variation information based on operation of one or more capacitive sensors attached to a headset in the proximity of a face of a user, wherein the headset comprises a microphone arm including a microphone, the microphone arm configured to extend over a cheek of the user to the proximity of the mouth of the user, the one or more capacitive sensors each comprising a capacitive electrode configured to detect a capacitance between the electrode and a corner of the user's mouth indicative of facial movements of the user's face while the capacitive electrode and the corner of the user's mouth are at a non-zero distance from one another, and wherein the capacitance variation information comprises a signal indicative of a non-binary range of temporal variations in distance between the electrode and the corner of the user's mouth;
searching for the associated facial changes from the received capacitance variation information using the facial detection criteria; and
determining the facial change that is associated with the matched facial detection criteria in question on finding a sufficient correspondence between the facial detection criteria and the received capacitance variation information.

7. The method of claim 6 further comprising repeatedly providing determinations of facial changes to a data sink.

8. The method of claim 6 further comprising monitoring if either the determination of facial changes has become impossible or a termination signal is received and responsive to either event taking place, terminating the performing of the method.

9. An apparatus, comprising:
at least one processor; and
at least one memory including computer program code;
the at least one memory and the computer program code being configured to, with the at least one processor, cause the apparatus to perform at least the following:
associating facial detection criteria with facial movements;
receiving capacitance variation information based on operation of one or more capacitive sensors attached to a headset in the proximity of a face of a user, wherein the headset comprises a microphone arm including a microphone, the microphone arm configured to extend over a cheek of the user to the proximity of the mouth of the user, the one or more capacitive sensors each comprising a capacitive electrode configured to detect a capacitance between the electrode and a corner of the user's mouth indicative of facial movements of the user's face while the capacitive electrode and the corner of the user's mouth are at a non-zero distance from one another, and wherein the capacitance variation information comprises a signal indicative of a non-binary range of temporal variations in distance between the electrode and the corner of the user's mouth;
searching for the associated facial changes from the received capacitance variation information using the facial detection criteria; and
determining the facial change that is associated with the matched facial detection criteria in question on finding a sufficient correspondence between the facial detection criteria and the received capacitance variation information.

10. A computer program product comprising a non-transitory computer-readable medium having computer program code embodied therein for use with a computer, the computer program code comprising:
code for associating facial detection criteria with facial movements;
code for receiving capacitance variation information based on operation of one or more capacitive sensors attached to a headset in the proximity of a face of a user, wherein the headset comprises a microphone arm including a microphone, the microphone arm configured to extend over a cheek of the user to the proximity of the mouth of the user, the one or more capacitive sensors each comprising a capacitive electrode configured to detect a capacitance between the electrode and a corner of the user's mouth indicative of facial movements of the user's face while the capacitive electrode and the corner of the user's mouth are at a non-zero distance from one another, and wherein the capacitance variation information comprises a signal indicative of a non-binary range of temporal variations in distance between the electrode and the corner of the user's mouth;
code for searching for the associated facial changes from the received capacitance variation information using the facial detection criteria; and
code for determining the facial change that is associated with the matched facial detection criteria in question on finding a sufficient correspondence between the facial detection criteria and the received capacitance variation information.

11. The apparatus of claim 1, wherein the detected capacitance between the electrode and the corner of the user's mouth is indicative of facial expressions of the user.

12. The method of claim 6, wherein the detected capacitance between the electrode and the corner of the user's mouth is indicative of facial expressions of the user.

13. The apparatus of claim 9, wherein the detected capacitance between the electrode and the corner of the user's mouth is indicative of facial expressions of the user.

14. The computer program product of claim 10, wherein the detected capacitance between the electrode and the corner of the user's mouth is indicative of facial expressions of the user.

15. The apparatus of claim 1, wherein the temporal variations in the distance between the capacitive electrode of the contactless proximity sensor and the corner of the user's mouth indicate distinctions between smiling, grimacing and talking.

16. The method of claim 6, wherein determining the facial change that is associated with the matched facial detection criteria in question comprises determining distinctions between smiling, grimacing and talking.

17. The computer program product of claim 10, wherein determining the facial change that is associated with the matched facial detection criteria in question comprises determining distinctions between smiling, grimacing and talking.

* * * * *